United States Patent
Gomez et al.

(10) Patent No.: US 10,038,674 B2
(45) Date of Patent: Jul. 31, 2018

(54) SECURE MOBILE DATA SHARING

(71) Applicants: Laurent Gomez, Pegomas (FR);
Cedric Hebert, Mougins (FR)

(72) Inventors: Laurent Gomez, Pegomas (FR);
Cedric Hebert, Mougins (FR)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 14/516,826

(22) Filed: Oct. 17, 2014

(65) Prior Publication Data
US 2016/0112376 A1 Apr. 21, 2016

(51) Int. Cl.
*H04L 29/06* (2006.01)

(52) U.S. Cl.
CPC .......... *H04L 63/0428* (2013.01); *H04L 63/20* (2013.01)

(58) Field of Classification Search
CPC ... H04L 63/062; H04L 63/061; H04L 63/102; H04L 9/08; H04L 9/32; G06F 21/6218
See application file for complete search history.

(56) References Cited

U.S. PATENT DOCUMENTS

| | | | |
|---|---|---|---|
| 7,386,785 B2 | 6/2008 | Ulmer et al. | |
| 7,587,676 B2 | 9/2009 | Gomez et al. | |
| 7,673,141 B2 | 3/2010 | Kilian-Kehr et al. | |
| 7,685,536 B2 | 3/2010 | Hebert et al. | |
| 8,468,598 B2 | 6/2013 | Hebert | |
| 8,473,962 B2 | 6/2013 | Hebert et al. | |
| 8,548,627 B2 | 10/2013 | Ulmer et al. | |
| 8,590,057 B1* | 11/2013 | Mayblum | H04L 9/0891 726/17 |
| 8,689,352 B2 | 4/2014 | Schaad et al. | |
| 8,726,151 B2 | 5/2014 | Rahaman et al. | |
| 8,726,395 B2 | 5/2014 | Gomez et al. | |
| 8,744,892 B2 | 6/2014 | Reznichenko et al. | |
| 8,775,127 B2 | 7/2014 | Gomez et al. | |
| 8,819,131 B2 | 8/2014 | Hebert et al. | |
| 2003/0237005 A1* | 12/2003 | Bar-Or | H04L 63/0435 726/10 |

(Continued)

OTHER PUBLICATIONS

Cathalo et al., Efficient and Non-interactive Timed-Release Encryption, 2005.*

(Continued)

*Primary Examiner* — Hadi S Armouche
*Assistant Examiner* — Huan V Doan
(74) *Attorney, Agent, or Firm* — Fish & Richardson P.C.

(57) ABSTRACT

Implementations of the present disclosure include methods, systems, and computer-readable storage mediums for providing secure mobile data sharing. Actions can include: receiving, by the one or more processors, a request for secure mobile data sharing, the request being received from a mobile device and comprising a security definition; obtaining, by the one or more processors, based at least in part on the security definition of the request: a decryption key, a recipient identifier, and a security policy; receiving, by the one or more processors, a decryption request from a third-party device, the decryption request comprising an identifier distinguishing the third-party device as a recipient of an encrypted message corresponding to the decryption key; and providing the decryption key to the third-party device in response to validating the decryption request.

15 Claims, 7 Drawing Sheets

(56) References Cited

U.S. PATENT DOCUMENTS

| | | | |
|---|---|---|---|
| 2004/0151323 A1* | 8/2004 | Olkin | G06Q 20/401 380/280 |
| 2004/0179684 A1* | 9/2004 | Appenzeller | H04L 9/0825 380/44 |
| 2006/0168062 A1 | 7/2006 | Hebert et al. | |
| 2006/0248336 A1* | 11/2006 | Bruns | H04L 9/3013 713/171 |
| 2007/0061589 A1 | 3/2007 | Ulmer et al. | |
| 2007/0130462 A1* | 6/2007 | Law | H04L 63/045 713/168 |
| 2007/0143403 A1 | 6/2007 | Ulmer et al. | |
| 2007/0180036 A1 | 8/2007 | Hebert et al. | |
| 2008/0077933 A1 | 3/2008 | Montagut et al. | |
| 2008/0167983 A1 | 7/2008 | Kadir et al. | |
| 2008/0184334 A1* | 7/2008 | Hebert | G06F 21/6218 726/1 |
| 2009/0077376 A1 | 3/2009 | Montagut et al. | |
| 2009/0172399 A1* | 7/2009 | Schmid | G06Q 10/107 713/168 |
| 2009/0327317 A1 | 12/2009 | Ulmer et al. | |
| 2011/0302410 A1* | 12/2011 | Clarke | H04L 9/0872 713/155 |
| 2012/0030122 A1 | 2/2012 | Rahaman et al. | |
| 2013/0160079 A1 | 6/2013 | Hebert | |
| 2013/0262397 A1 | 10/2013 | Hebert | |
| 2016/0065571 A1* | 3/2016 | Hoyos | H04L 63/0861 713/168 |

OTHER PUBLICATIONS

Perrig et al., ELK, a New Protocol for Efficient Large-Group Key Distribution, IEEE (Year: 2001).*

Voltage Technical Brief, The Identity-Based Encryption Advantage, 7 pages (Year: 2013).*

* cited by examiner

SECURE MOBILE DATA SHARING

BACKGROUND

Billions of people worldwide use mobile devices (e.g., phones and tablet computers) for both personal and business purposes. Mobile device applications supported by such mobile devices are often equipped to facilitate data sharing with other devices (e.g., other mobile devices or communications devices). The constant growth of data sharing through mobile devices has raised several security concerns in the business environment. Paramount among these security concerns is the protection of confidential data. Mobile device applications provided by a business entity for use by its employees may implement appropriate security measures for protecting confidential data, but third-party applications (e.g., email applications) used by outside vendors, for example, may not.

SUMMARY

Implementations of the present disclosure include computer-implemented methods for providing secure mobile data sharing, the methods being performed by one or more processors. In some implementations, methods include actions of: receiving, by the one or more processors, a request for secure mobile data sharing, the request being received from a mobile device and comprising a security definition; obtaining, by the one or more processors, based at least in part on the security definition of the request: a decryption key, a recipient identifier, and a security policy; receiving, by the one or more processors, a decryption request from a third-party device, the decryption request comprising an identifier distinguishing the third-party device as a recipient of an encrypted message corresponding to the decryption key; and providing the decryption key to the third-party device in response to validating the decryption request.

These and other implementations can each optionally include one or more of the following features: The mobile device may be running a mobile business application integrated with a third-party messaging application. The recipient identifier may include an email address. The security policy may include one or more security rules, at least one of the security rules defining an expiration time period after which the decryption key is deleted. The security policy may include one or more security rules, at least one of the security rules defining a security authentication technique for validating the decryption request. The security authentication technique may include at least one of an authentication password and a biometric authentication. The security policy may include one or more security rules, at least one of the security rules being defined by a user operating the mobile device through a user interface. The decryption request may be sent from the third-party device in response to receiving an encrypted message from the mobile device. Validating the decryption request may include executing one or more security rules of the security policy and determining that the third-party device is authorized to receive the decryption key. The methods may further include storing the security definition in a security repository remote from the mobile device and the third-party device. The security definition may include a first security definition, and the methods may further include: receiving a second security definition from a second mobile device; and storing the second security definition in the security repository. The first and second security definitions may be organized in the security repository based on a respective transaction identifier. The decryption request may further include a transaction identifier corresponding to the first security definition.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to systems, methods, and computer-readable media for providing secure mobile data sharing. In some implementations, a mobile device running a mobile business application will submit a request to a security server for secure mobile data sharing. In some implementations, the request may include a security definition indicating: a decryption key, a recipient identifier, and a security policy. In some implementations, a third-party device (e.g., a mobile or desktop device) can receive a data packet from the mobile business device. The data packet may include an encrypted data payload. In some implementations, the third-party device can submit a decryption request to the security server including an identifier distinguishing the third-party device as a recipient of the encrypted data packet. In response to receiving the decryption request, the security server can validate the request, and provide (e.g., through wireless transmission) a decryption key to the third-party device. The third party device can decrypt the encrypted data payload using the decryption key and process the decrypted data.

Figure 1:
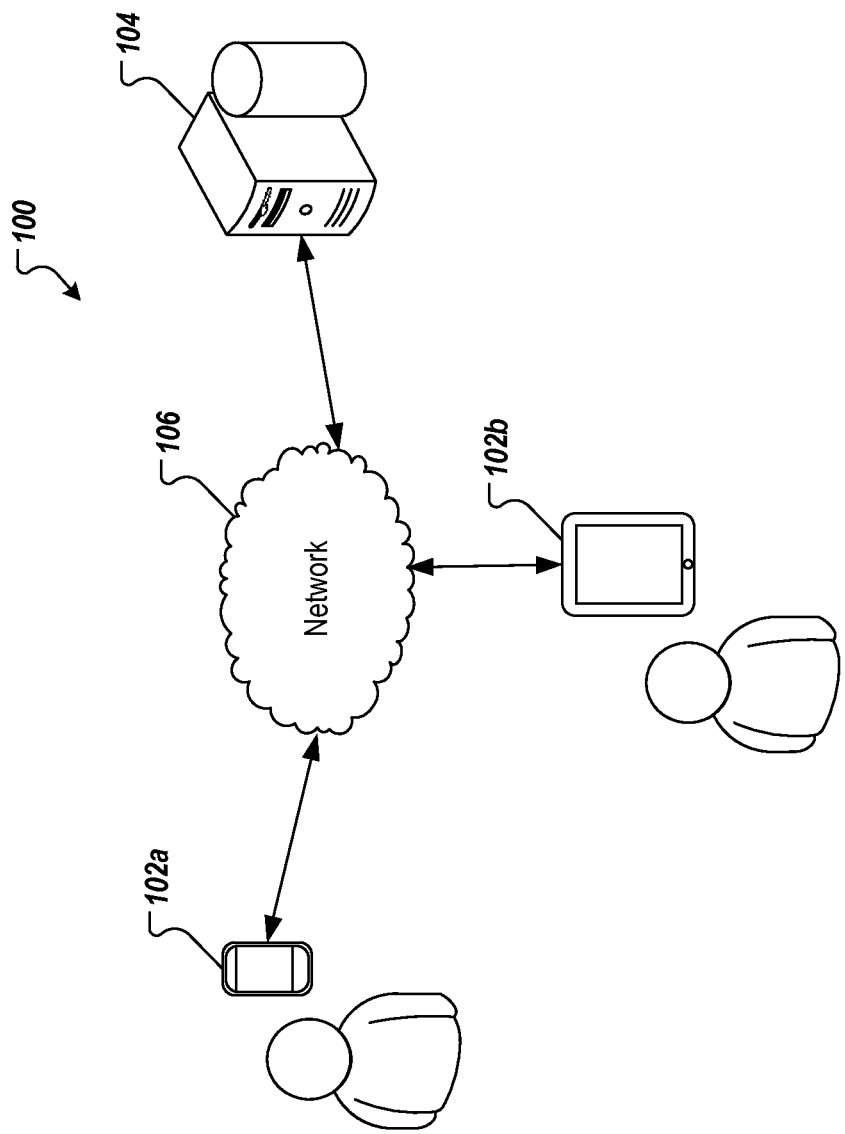
FIG. 1 depicts an example system architecture in accordance with implementations of the present disclosure.

FIG. 1 depicts an example system architecture 100 in accordance with implementations of the present disclosure. The example system architecture 100 includes a client-side mobile computing devices (mobile devices) 102a and 102b, a server-side computing device (a server device) 104 and a network 106. In general, the mobile devices 102a and 102b can include any appropriate type of handheld device that operates using a mobile operating system. Example mobile operating systems can include Android, provided by Google, Inc., and iOS provided by Apple, Inc. Example mobile devices can include a handheld computer, a tablet computing device, a personal digital assistant (PDA), a cellular telephone, a network appliance, a camera, a smartphone, an enhanced general packet radio service (EGPRS) mobile phone, a media player, a navigation device, an email device, or any appropriate combination of any two or more of these data processing devices or other data processing devices. In the example system architecture 100 of FIG. 1, the mobile devices 102a and 102b are depicted as a smartphone and a tablet computing device. The server device 104 can include one or more computing devices and one or more machine-readable repositories, or databases.

The mobile devices 102a and 102b can communicate with one another and with the server device 104 over the network 106. The network 106 can include a large computer network, such as a local area network (LAN), a wide area network (WAN), the Internet, a cellular network, or a combination thereof connecting any number of mobile devices, fixed computing devices and server systems. In some embodiments, the server device 104 and the client mobile client devices 102a and 102b can communicate over multiple networks. As one example, in some implementations, voice communications between the mobile client devices 102a and 102b may be conducted over a cellular network, while email communications may be conducted over the Internet.

The mobile devices 102a and 102b can execute one or more mobile applications through the mobile operating system. For example, the mobile devices 102a and 102b can execute messaging applications to facilitate communications (e.g., email, SMS text messaging, voice messaging, and/or video messaging communications) over the network 106. Further, in some examples, the mobile device 102a may be equipped to run one or more mobile business applications. The mobile business applications may access confidential data (e.g., customer information, employee information, financial data, asset details, etc.) from back-office systems of the business. In some implementations, a mobile business application running on the mobile device 102a can share confidential data with the mobile device 102b through the messaging applications. For example, a CEO of the business may need to send confidential financial information to a bank for facilitating the purchase of a large asset. While the mobile business application may be inherently operable to implement security measures compliant with security policies of the business, the messaging applications facilitating the data transfer between the mobile devices 102a and 102b may not be appropriately configured from a security standpoint. In this case, it is desirable to implement a security protocol for providing secure mobile data sharing to prevent data hijacking and inadvertent leaks of confidential data.

In some implementations, the server device 104 operates as a security server for facilitating secure mobile data sharing between the mobile devices 102a and 102b. For example, as described in detail below, the server device 104 can receive a request for secure mobile data sharing from the mobile device 102a, and process the request to ascertain various aspects of a security definition included in the request. In some implementations, the security definition can include a decryption key, a recipient identifier, and a security policy.

In some implementations, the decryption key includes information necessary for performing a transformation of the encrypted data payload into functional data output or "plaintext" (e.g., text messages, document content, audio and video files, digital images, etc.). In some implementations, the decryption key is paired with a corresponding encryption key. In some implementations, the decryption key includes data for parameterizing a decryption algorithm (a cipher) and a unique sequence of characters that can be used in conjunction with the decryption algorithm to decrypt an encrypted data payload. The decryption key (and the encryption key) can be generated by the mobile business application or by software operating on the server device 104. In some implementations, the encryption key/decryption key pair can be produced by a random number generator. In some implementations, the recipient identifier can be any suitable sequence of characters for uniquely identifying the mobile device 102b, to which the encrypted data has been sent. In the example set forth above, the confidential data obtained by the mobile business application is being shared through messaging applications. Thus, an email address accessible by the mobile device 102b could be serve as a suitable recipient identifier. In some implementations, the security policy can include information to parameterize security rules for managing the decryption key at the server device 104. For example, as described below, in some implementations, the security policy may include information for determining when the decryption key should be deleted from storage by the server device.

Figure 2:
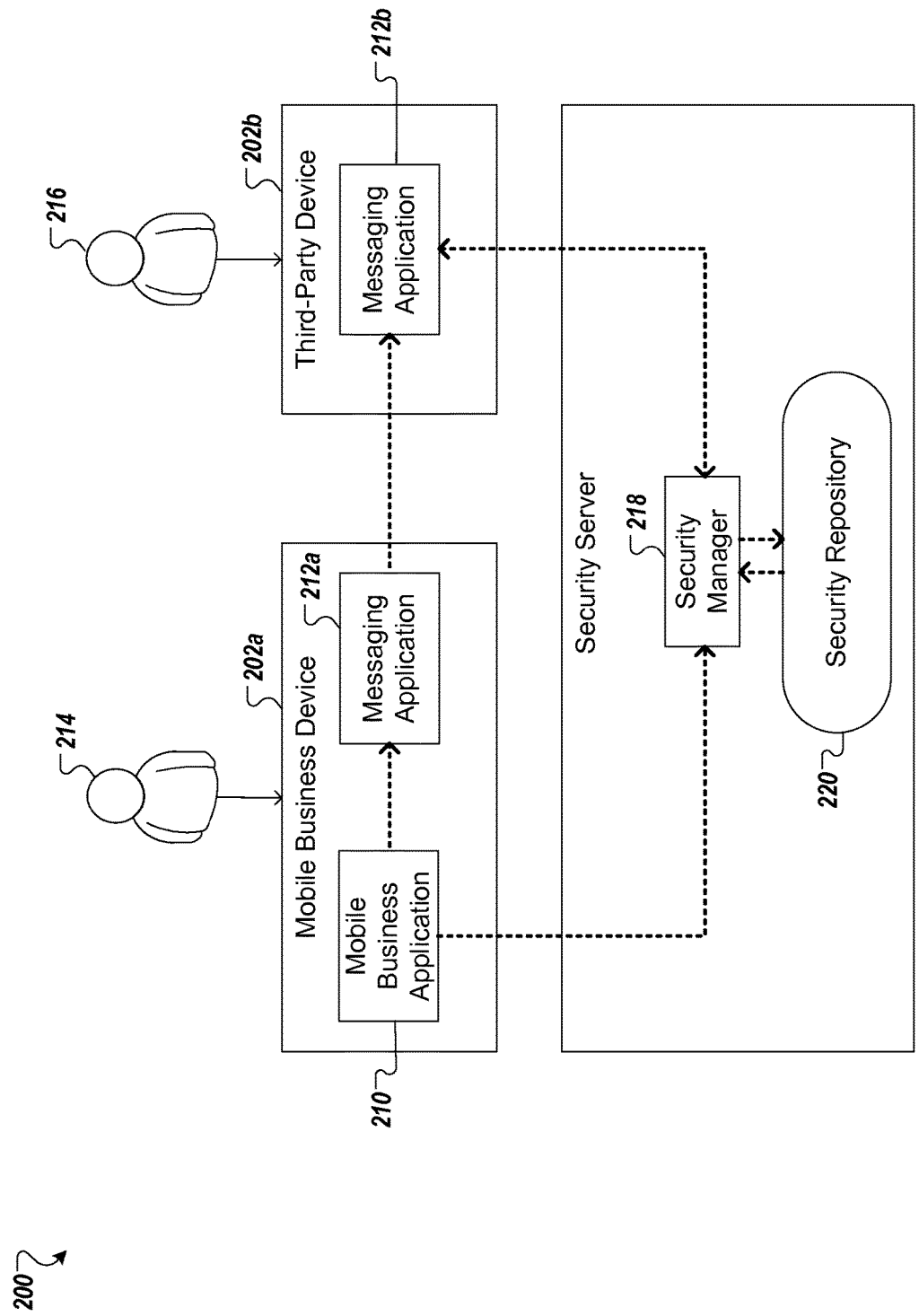
FIG. 2 depicts an example system for providing secure mobile data sharing.

FIG. 2 depicts an example system 200 for providing secure mobile data sharing. As shown, the system 200 includes a mobile business device 202a, a third-party device 202b and a security server 204. The devices 202a and 202b and the security server 204 are communicatively coupled to one another over a suitable communications network (not shown). The mobile business device 202a executes a mobile business application 210 and a messaging application 212a; and the third-party device 202b executes a messaging application 212b. In some implementations, the messaging applications 212a and 212b may be operable to facilitate text, voice, or video messaging between the devices 202a and 202b.

A user 214 operating the mobile business device 202a may opt to send a message including confidential data obtained through the mobile business application 210 to a user 216 operating the third-party device 202b. In this example, the mobile business application 210 is integrated with the messaging application 212a, so that confidential data imported by the mobile business application 210 can be distributed ("shared") using the messaging application 212a. In preparation for sending the confidential data, the mobile business application 210 can encrypt the data payload of the message. In some implementations, the mobile business application 210 is operable to generate an encryption key and a decryption key to perform the encryption. In some implementations, the mobile business application 210 requests a suitable encryption key from the security server 204. The encrypted message is sent from the mobile business device 202a to the third-party device 202b through the messaging applications 212a and 212b; and a security definition related to the transaction is sent from the mobile business device 202a to the security server 204 as a request for secure mobile data sharing.

The security server 204 includes a security manager 218 and a security repository 220. The security manager 218 receives the security definition from the mobile business device 202a and stores information pertaining to the security definition in the security repository 220. For example, the security manager 218 may store a decryption key applicable to the encrypted message in the security repository 220. In some implementations, the security manager 218 may also store a recipient identifier (e.g., an email address) in the security repository 220. The decryption key and the recipient identifier can be mapped to one another in the security repository 220, and organized according to a suitable transaction identifier. In some examples, the security repository 220 can be provided in the form of a relational database or a directory database. The transaction identifier can be any suitable sequence of characters for uniquely identifying a transaction of encrypted data. In some implementations, the security manager 218 generates the transaction identifier upon receipt of the security definition and provides the transaction identifier to the mobile business application 212 as verification of receipt. In some implementations, the mobile business application 212 generates the transaction identifier, and includes the transaction identifier in the security definition.

In some implementations, the security manager 218 is operable to interpret and execute a security policy included in the security definition. In some implementations, the security policy includes one or more security rules pertaining to management of the decryption key. As one example, a security rule included in the security policy may provide an expiration time (e.g., X amount of days) for the decryption key. In this example, the decryption key may be deleted after the expiration time has passed, and/or one or more other security rules may be made more stringent after the expiration time has passed. As another example, a security rule may establish a retrieval password that a recipient user (e.g., the user 216 operating the third-party device 202b) must provide to receive the decryption key. Other similar examples may incorporate other appropriate authentication measures (e.g., biometric authentication or one or more security authentication questions). Of course, the example security rules described above are provide merely for purposes of exemplifying various implementations that are within the scope of the present disclosure and are not intended to be limiting. Further, various implementations, may incorporate one or more additional security rules into the security policy without departing from the scope of this disclosure.

Upon receipt of the encrypted message from the mobile business device 202a, the user 216 may operate the third-party device 202b to retrieve a decryption key. In this example, the messaging application 212b requests the decryption key from the security server 204. In some implementations, the request includes a recipient identifier (e.g., an email address) and authentication information (e.g., a password, biometric authentication data, etc.). The security manager 218 receives the request and, in some implementations, executes one or more rules included in the security policy. If the security policy has been fulfilled, the security manager 218 retrieves the decryption key from the security repository 220 based on the recipient identifier included in the request; and provides the decryption key to the messaging application 212b for processing the encrypted message.

Figure 3:
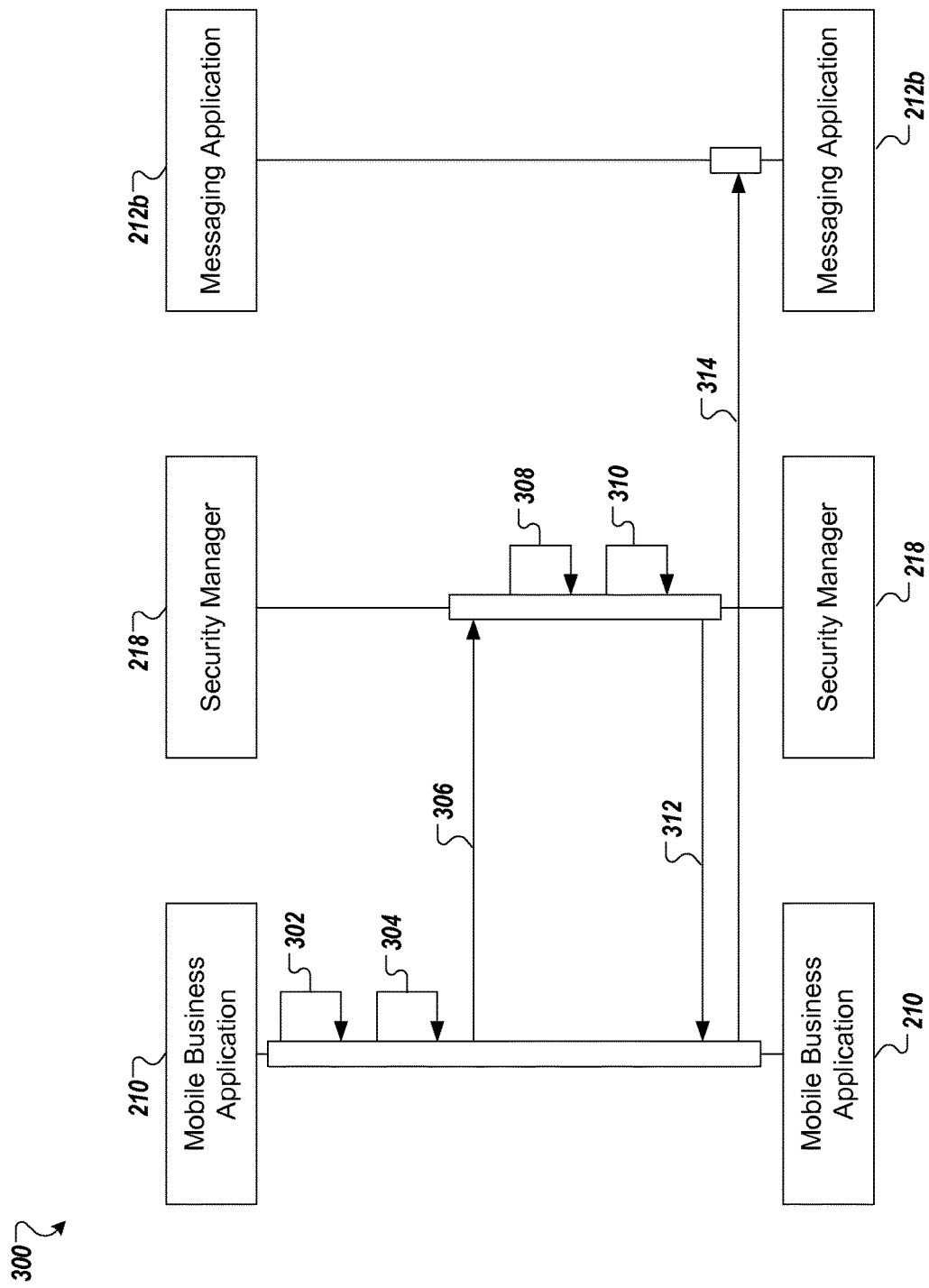
FIG. 3 depicts an example protocol in accordance with implementations of the present disclosure.

FIG. 3 depicts an example protocol 300 for sending an encrypted message in accordance with implementations of the present disclosure. In the example of FIG. 3, the mobile business application 210 running on the mobile business device 202a generates (302) an encryption key/decryption key pair, e.g., through a random number generator. The mobile business application 210 then encrypts (304) the payload of the message using the encryption key and a suitable encryption algorithm. The mobile business application 210 submits (306) a request for secure mobile data sharing to the security manager 218. The request includes a security definition outlining various aspects of the secure data sharing transaction. In some implementations, the security definition includes the encryption key/decryption key pair, one or more recipient identifiers, and a security policy. The security manager 218 generates (308) a transaction identifier to uniquely identify the secure data sharing transaction; and stores (310) information relating to the security definition, including the decryption key, in a security repository. In some implementations, the decryption and the one or more recipient identifiers are stored in the security repository under the transaction identifier. The security manager 218 provides (312) the transaction identifier to the mobile business application 210 to verify receipt of the request. In response to receipt of the transaction identifier, the mobile business application 210 provides (314), through the integrated messaging application 212, the encrypted message to the messaging application 212b running on the third-party device 202b.

Figure 4:
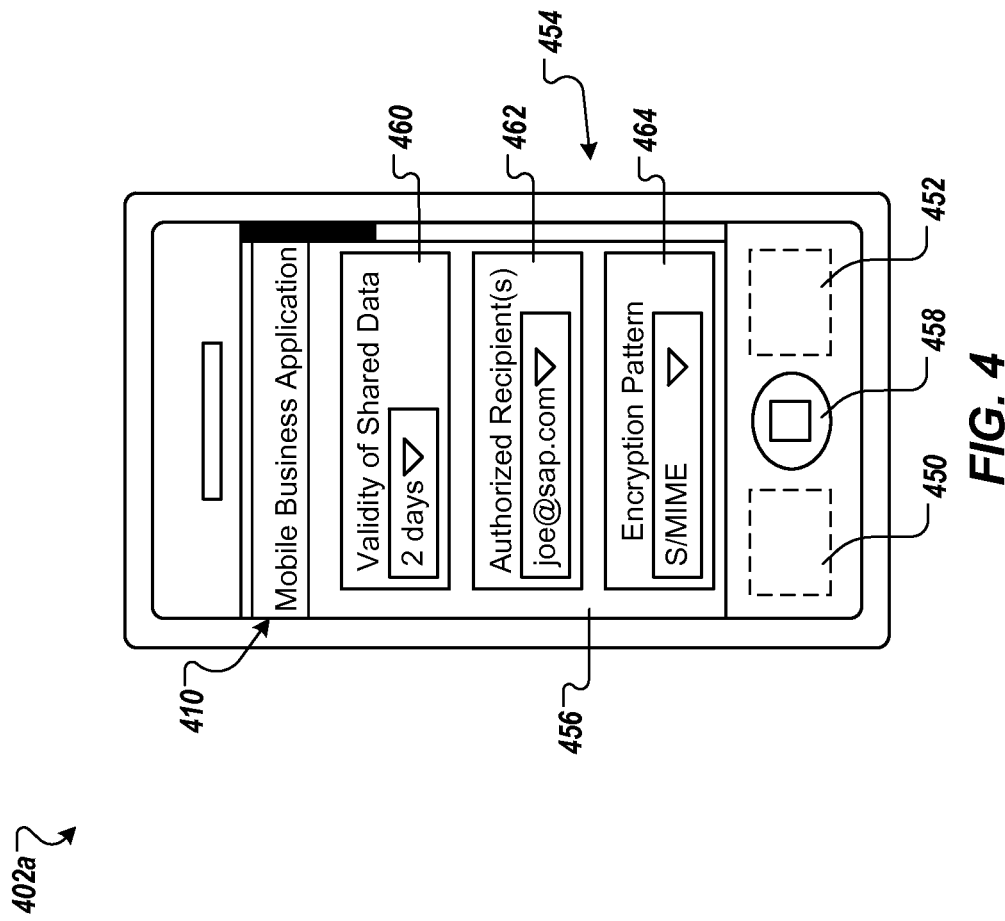
FIG. 4 depicts an example mobile device in accordance with implementations of the present disclosure.

FIG. 4 depicts an example mobile device 402a running a mobile business application 410 in accordance with implementations of the present disclosure. In this example, the mobile device 402a is provided in the form of a smartphone including a wireless communication device 450 (shown schematically) for sending and receiving messages over a network (e.g., the network 106) and a controller 452 (shown schematically) for executing the mobile business application 410. The mobile device 402a further includes a user interface 454 including a touchscreen 456 and at least one button 458.

In some implementations, the mobile device 402a can connect with an application store to provide a user the ability to browse a list of remotely stored application programs (such as the mobile business application 410 or other mobile applications) that the user may download over the network and install on the mobile device 402a. The application store may serve as a repository of applications developed by a particular business entity or third-party application developers. In some implementations, the mobile business application may be implemented as a cloud-based application program hosted remotely from the mobile device 402a by one or more server devices.

According to the example of FIG. 4, the mobile business application 210 displays various options to a user for secure mobile data sharing through the touch screen 456 of the mobile device 402a. By interfacing with the touch screen 456 component of the user interface 454, the user can customize certain aspects of the secure data sharing transaction. In this example, the mobile business application 210 causes at least three graphical user interface (GUI) elements 460, 462, and 464 to display on the touch screen 456. In this example the GUI elements 460, 462, and 464 are provided in the form of dropdown lists, however other suitable configuration are also within the scope of this disclosure. As shown, the first GUI element 460 provides the user with an option to define an expiration time (e.g., a number of days) for the decryption key. As noted above, in some implementations, the decryption key may be deleted from the security repository after the expiration time has passed. The second GUI element 462 provides the user with an option to define one or more recipient identifiers (e.g., email addresses) to distinguish authorized recipients of the shared data. The third GUI element 464 provides the user with an option to define an encryption pattern (e.g., a S/MIME, TLS, and PGP encryption pattern) for encrypting the shared data.

Figure 5:
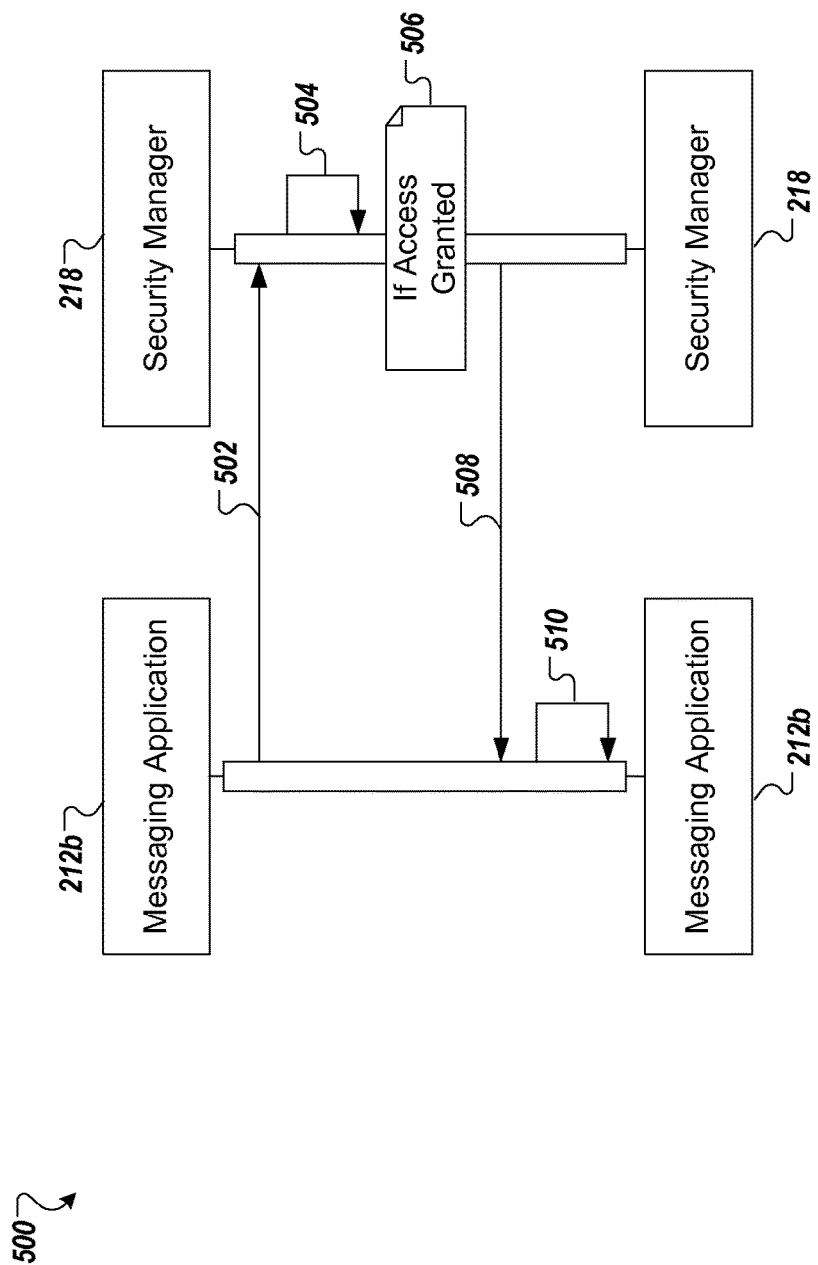
FIG. 5 depicts an example protocol in accordance with implementations of the present disclosure.

FIG. 5 depicts an example protocol 500 for decrypting an encrypted message in accordance with implementations of the present disclosure. In the example of FIG. 5, the messaging application 210*b* submits (502) a decryption request to the security manager 218. In some examples, the decryption request includes an identifier distinguishing the third-party device 202*b* as a recipient of the encrypted message from the mobile business application 212 running on the mobile business device 202*a*. In some implementations, the identifier is provided in the form of an email address. In some implementations, the decryption request further includes a transaction identifier uniquely identifying the decryption key in the security repository. In some implementations, the decryption request further includes security authentication data, e.g., a password or the like. The security manager 218 enforces (504) a security policy associated with a decryption key identified based on the decryption request. If access to the decryption key is granted based on the security policy (506), the decryption key is provided (508) to the messaging application 210*b*. The messaging application 210*b* processes (510) the decryption key to decrypt the encrypted message.

Figure 6:
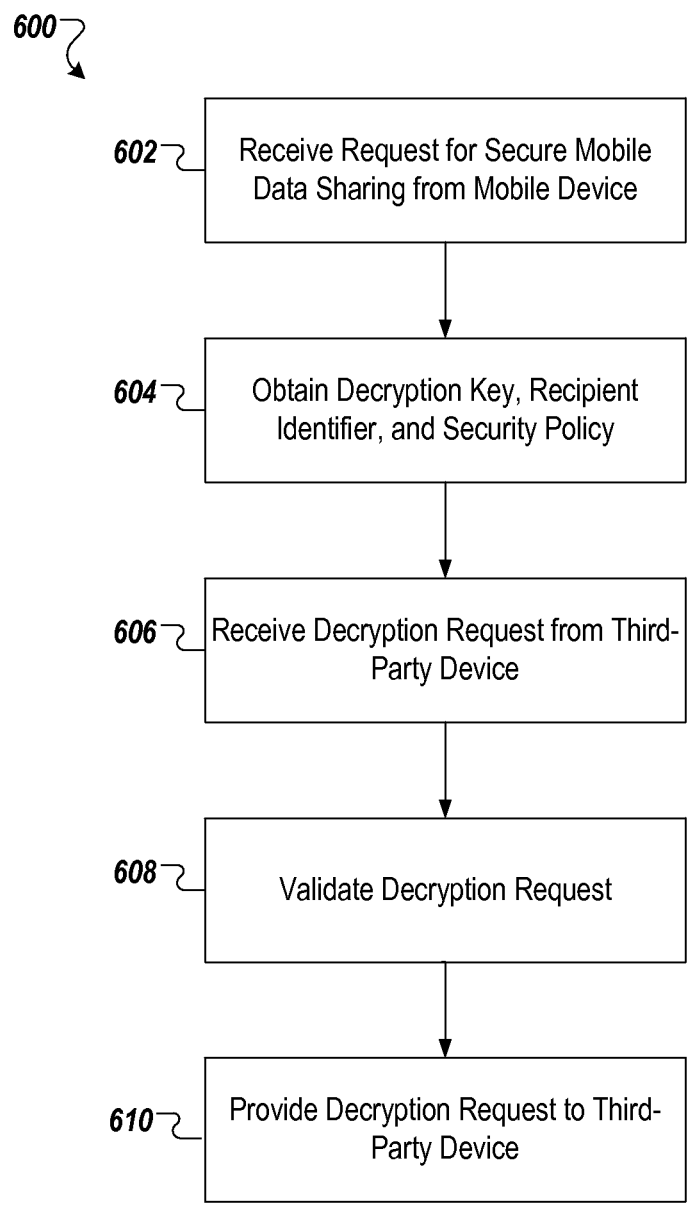
FIG. 6 depicts an example process that can be executed in accordance with implementations of the present disclosure.

FIG. 6 depicts an example process 600 that can be executed in accordance with implementations of the present disclosure. In some implementations, the example process 600 can be realized using one or more computer-executable programs (e.g., a browser, a web application, a mobile application) executed using one or more computing devices (e.g., a client-side computing device, a server-side computing device).

According to the example process 600, a request for secure mobile data sharing is received (602). In some implementations, the request is received from a mobile device (e.g., a smartphone) running a mobile business application and a messaging application. In some implementations, the request includes a security definition defining various aspects of the secure data sharing transactions. In response to receiving the request, a decryption key, a recipient identifier, and a security policy are obtained. The decryption key may be generated by the mobile device submitting the request, or by one or more processors at a security server receiving the request. In some implementations, the recipient identifier is provided in the form of an email address included in the request. In some implementations, the security policy includes one or more security rules for managing the decryption key. The security policy may include one or more default security rules and/or one or more user-defined security rules parameterized through a mobile business application.

A decryption request is received (606) from a third party device. In some implementations, the third party device submits the decryption request in response to receiving a data packet (e.g., an email, SMS text message, voice or video message) with an encrypted payload. In some implementations, the third party device is a mobile device (e.g., a smartphone or a tablet computer) running a messaging application. Further, in some implementations, the decryption request can include a recipient identifier distinguishing the third party device as a recipient of an encrypted message.

Further still, in some implementations, the decryption request can include a transaction identifier for located the decryption key in a security repository. The decryption request is validated (608); and, in response to the validation, the decryption key is provided (610) to the third party device. In some implementations, validating the decryption request includes matching the recipient identifier included in the decryption request to a recipient identifier mapped to the decryption key in a security repository. In some implementations, validating the decryption request includes executing one or more security rules included in the security policy. For example, the security rules may require validation of the decryption request through authentication measures, such as password authentication, biometric authentication, etc.

Figure 7:
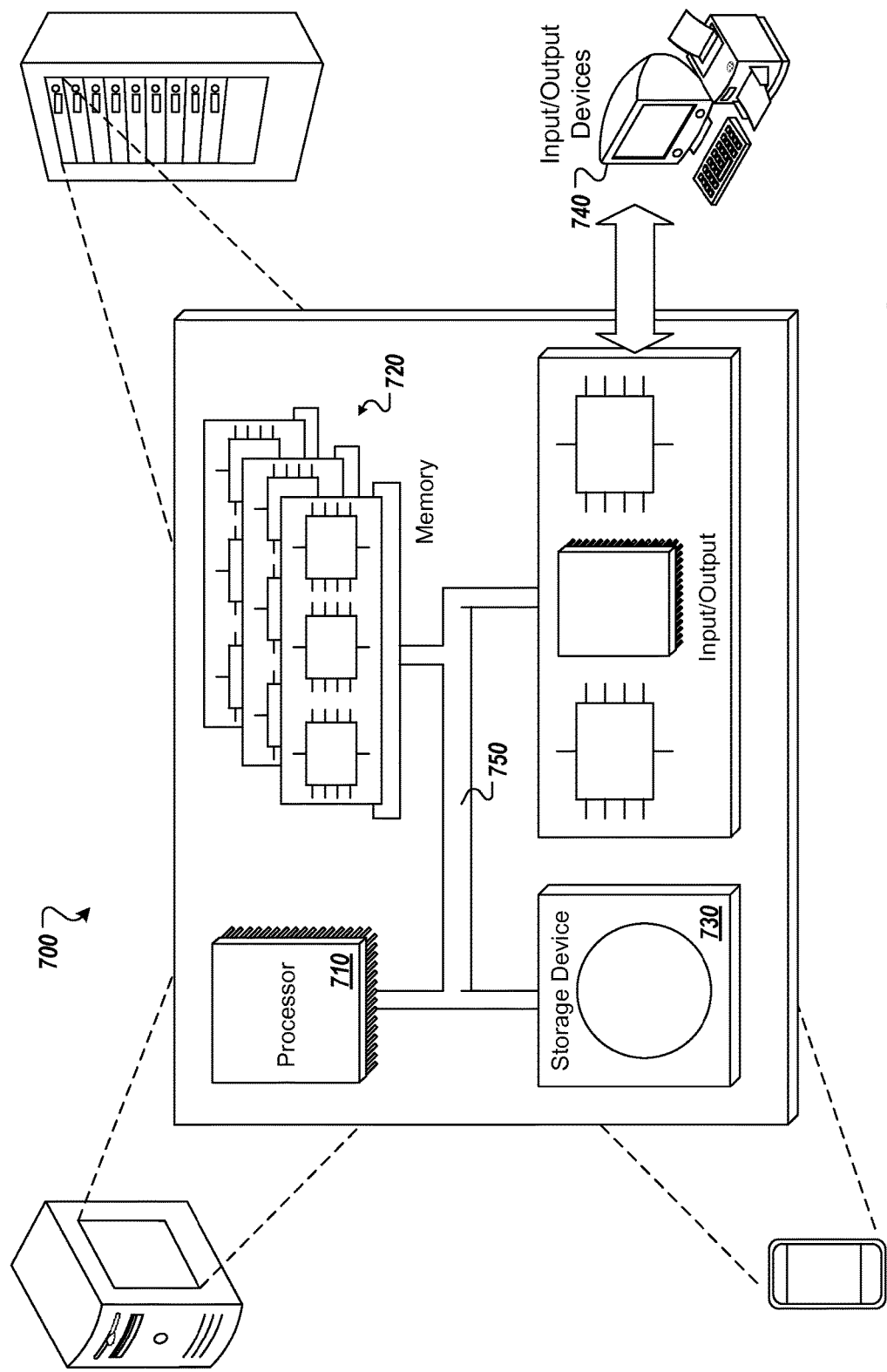
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. Each of the components 710, 720, 730, 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing secure mobile data sharing using a security server, the method being executed using one or more processors and comprising:

receiving, by the one or more processors, a request for secure mobile data sharing between a mobile device and a third-party device, the request being received from the mobile device and comprising a security definition, a recipient identifier, and a security policy, the security definition comprising a decryption key, the recipient identifier comprising a recipient address, and the security policy comprising one or more security rules, at least one security rule defining an expiration time period after which the decryption key is deleted from a security repository, the expiration time period being set by a user of the mobile device, the mobile device running a messaging application;

obtaining, by the one or more processors, based at least in part on the security definition of the request: the decryption key, the recipient identifier, and the security policy, the decryption key and the recipient identifier being mapped to one another within the security repository and being organized according to a transaction identifier, the transaction identifier being generated by a security manager upon receipt of the security definition to uniquely identify a secure data sharing transaction, the security manager being included in the security server;

providing, by the one or more processors, the transaction identifier to the messaging application to verify receipt of the request;

receiving, by the one or more processors, a decryption request from the third-party device, the decryption request comprising the recipient identifier distinguishing the third-party device as a recipient of an encrypted message corresponding to the decryption key, the encrypted message comprising a data payload encrypted by the mobile device based on an encryption pattern selected by the user of the mobile device from a plurality of encryption patterns available in the messaging application, the encrypted message being transmitted from the mobile device to the third-party device through the messaging application; and providing, by the one or more processors, the decryption key to the third-party device in response to validating the decryption request.

2. The method of claim 1, wherein the mobile device is running a mobile application integrated with a third-party messaging application.

3. The method of claim 1, wherein the recipient identifier comprises an email address.

4. The method of claim 1, wherein the at least one of the security rules becomes more stringent after the expiration time period has passed.

5. The method of claim 1, wherein the security policy includes one or more security rules, at least one of the security rules defining a security authentication technique for validating the decryption request.

6. The method of claim 5, wherein the security authentication technique comprises at least one of an authentication password and a biometric authentication.

7. The method of claim 1, wherein the security policy includes one or more security rules, at least one of the security rules being defined by a user operating the mobile device through a user interface.

8. The method of claim 1, wherein the decryption request is sent from the third-party device in response to receiving an encrypted message from the mobile device.

9. The method of claim 1, wherein validating the decryption request comprises executing one or more security rules of the security policy and determining that the third-party device is authorized to receive the decryption key.

10. The method of claim 1, further comprising:
storing the security definition in a security repository remote from the mobile device and the third-party device.

11. The method of claim 10, wherein the security definition comprises a first security definition, and wherein the method further comprises:
receiving a second security definition from a second mobile device; and
storing the second security definition in the security repository.

12. The method of claim 11, wherein the first and second security definitions are organized in the security repository based on a respective transaction identifier.

13. The method of claim 11, wherein the decryption request further comprises a transaction identifier corresponding to the first security definition.

14. A non-transitory computer-readable storage medium coupled to one or more processors and having instructions stored thereon which, when executed by the one or more processors, cause the one or more processors to perform operations for providing secure mobile data sharing using a security server, the operations comprising:
receiving, by the one or more processors, a request for secure mobile data sharing between a mobile device and a third-party device, the request being received from the mobile device and comprising a security definition, a recipient identifier, and a security policy, the security definition comprising a decryption key, the recipient identifier comprising a recipient address, and the security policy comprising one or more security rules, at least one security rule defining an expiration time period after which the decryption key is deleted from a security repository, the expiration time period being set by a user of the mobile device, the mobile device running a messaging application;
obtaining, by the one or more processors, based at least in part on the security definition of the request: the decryption key, the recipient identifier, and the security policy, the decryption key and the recipient identifier being mapped to one another within the security repository and being organized according to a transaction identifier, the transaction identifier being generated by a security manager upon receipt of the security definition to uniquely identify a secure data sharing transaction, the security manager being included in the security server;
providing, by the one or more processors, the transaction identifier to the messaging application to verify receipt of the request;
receiving, by the one or more processors, a decryption request from the third-party device, the decryption request comprising the recipient identifier distinguishing the third-party device as a recipient of an encrypted message corresponding to the decryption key, the encrypted message comprising a data payload encrypted by the mobile device based on an encryption pattern selected by the user of the mobile device from a plurality of encryption patterns available in the messaging application, the encrypted message being transmitted from the mobile device to the third-party device through the messaging application; and
providing, by the one or more processors, the decryption key to the third-party device in response to validating the decryption request.

15. A system, comprising:
a client-side computing device; and
a computer-readable storage device coupled to the client-side computing device and having instructions stored thereon which, when executed by the client-side computing device, cause one or more processors of the client-side computing device to perform operations for providing secure mobile data sharing using a security server, the operations comprising:
receiving, by the one or more processors, a request for secure mobile data sharing between a mobile device and a third-party device, the request being received from the mobile device and comprising a security definition, a recipient identifier, and a security policy, the security definition comprising a decryption key, the recipient identifier comprising a recipient address, and the security policy comprising one or more security rules, at least one security rule defining an expiration time period after which the decryption key is deleted from a security repository, the expiration time period being set by a user of the mobile device, the mobile device running a messaging application;
obtaining, by the one or more processors, based at least in part on the security definition of the request: the decryption key, the recipient identifier, and the security policy, the decryption key and the recipient identifier being mapped to one another within the security repository and being organized according to a transaction identifier, the transaction identifier being generated by a security manager upon receipt of the security definition to uniquely identify a secure data sharing transaction, the security manager being included in the security server;
providing, by the one or more processors, the transaction identifier to the messaging application to verify receipt of the request;
receiving, by the one or more processors, a decryption request from the third-party device, the decryption request comprising the recipient identifier distinguishing the third-party device as a recipient of an encrypted message corresponding to the decryption key, the encrypted message comprising a data payload encrypted by the mobile device based on an encryption pattern selected by the user of the mobile device from a plurality of encryption patterns available in the messaging application, the encrypted message being transmitted from the mobile device to the third-party device through the messaging application; and
providing, by the one or more processors, the decryption key to the third-party device in response to validating the decryption request.

* * * * *